J. Owens.
Woven Fabric.

N° 97,434.　　　　　　　　　　　　Patented Nov. 30, 1869.

Witnesses.
Gustave Dieterich
Charles A. Nash

Inventor.
John Owens
pr Munn & Co
Attorneys

J. Owens.
Woven Fabric.

N° 97,434.     Patented Nov. 30, 1869.

Witnesses.
Gustave Dietrich
Charles A. Nash

Inventor.
John Owens
per Munn & Co.

J. Owens.
Woven Fabric.
N° 97,434.
Patented Nov. 30, 1869.
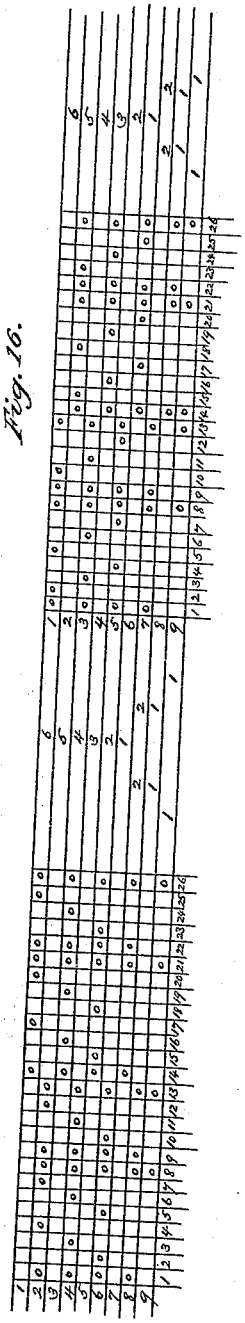
Fig. 15.
Fig. 16.
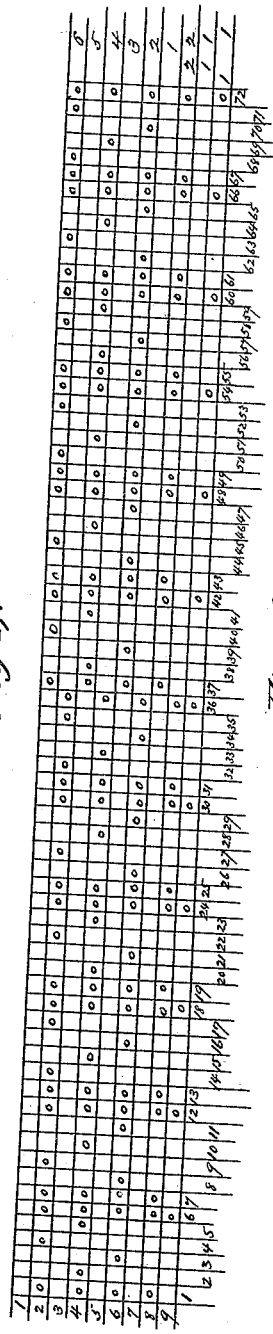
Fig. 17.
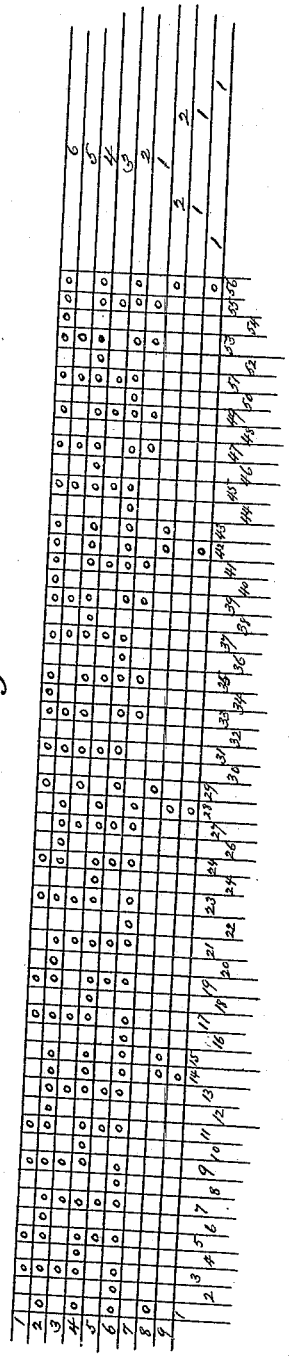
Fig. 18.
Witnesses.
Gustave Dieterich
Charles A. Nash
Inventor.
John Owens
per Munn & Co.
Attorneys J. Owens.
Woven Fabric.

N° 97,434.  Patented Nov. 30, 1869.

Sheet 4—11 Sheets.

Witnesses.
Gustave Dieterich
Charles A. Nash

Inventor:
John Owens
pr Munn & Co
Attorneys

J. Owens.
Woven Fabric.

N°97,434.  Patented Nov. 30, 1869.

Witnesses.
Gustave Dietrich
Charles R. Nash

Inventor.
John Owens,
per Munn & Co.
Attorneys.

J. Owens.
Woven Fabric.

N°97,434. Patented Nov. 30, 1869.

Sheet 6-11 Sheets.

Witnesses.
Gustave Dieterich
Charles F. Nash

Inventor.
John Owens
pr Munn & Co
Attorneys

J. OWENS.
Woven Fabric.

No. 97,434.                    Patented Nov. 30, 1869.

Witnesses.
Gustave Dieterich
Charles A. Nash

Inventor.
John Owens
per Munn & Co.
Attorneys

J. Owens.
Woven Fabric.

No. 97,434.   Patented Nov. 30, 1869.

Witnesses.
Gustave Dieterich
Charles A. Nash

Inventor.
John Owens
pr Munn & Co
Attorneys

J. Owens.
Woven Fabric.
No. 97,434.          Patented Nov. 30, 1869.
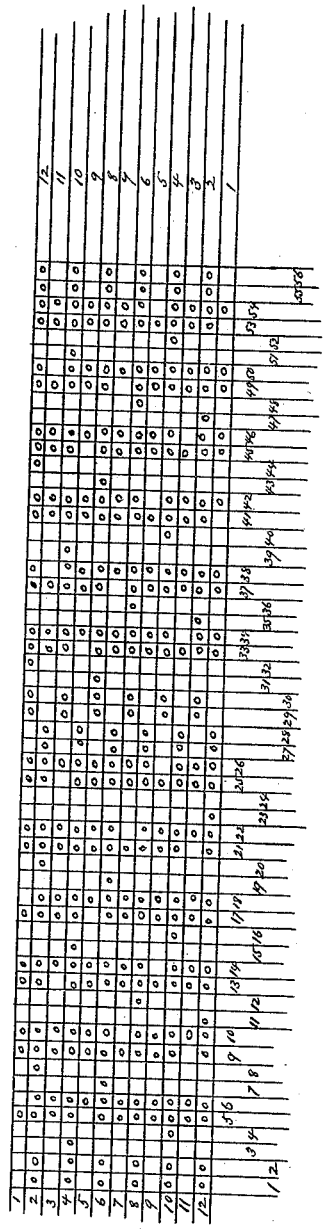
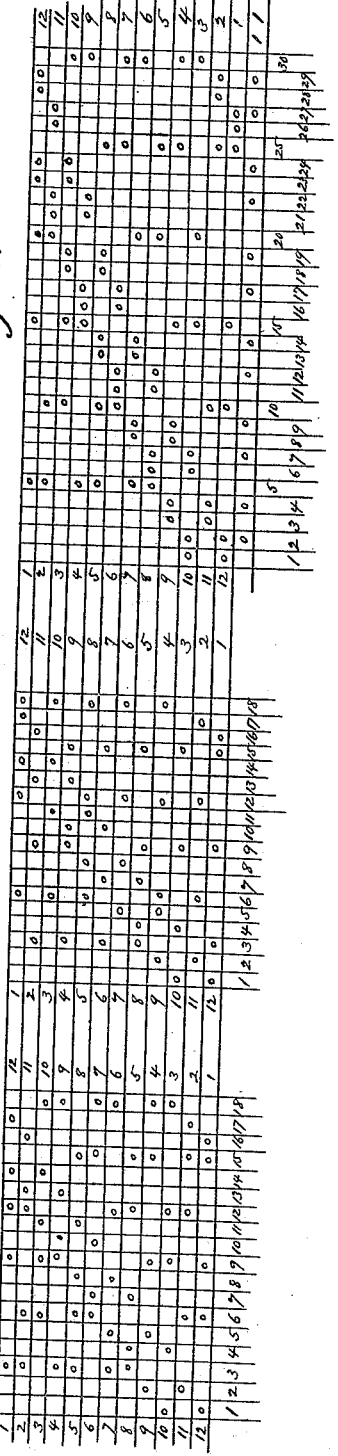
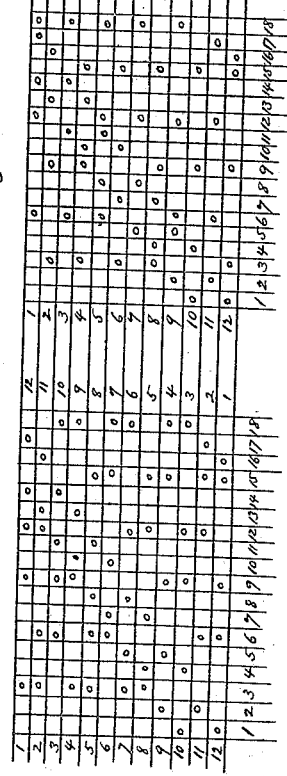
Witnesses.
Gustave Dieterich
Charles F. Nash
Inventor:
John Owens
pr Munn & Co
Attorneys J. Owens
Woven Fabric.
N°. 97,434.   Patented Nov. 30, 1869.
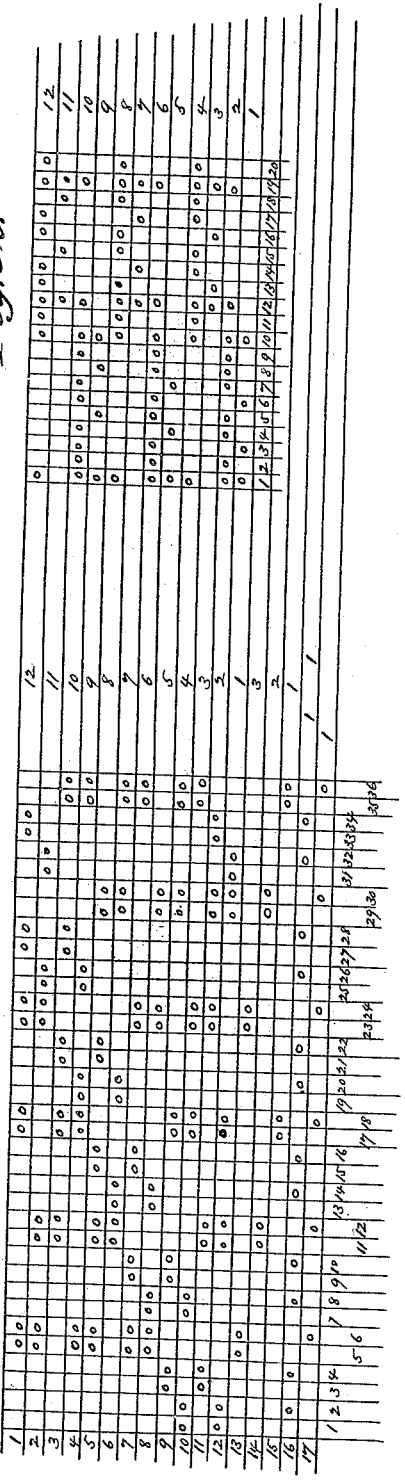
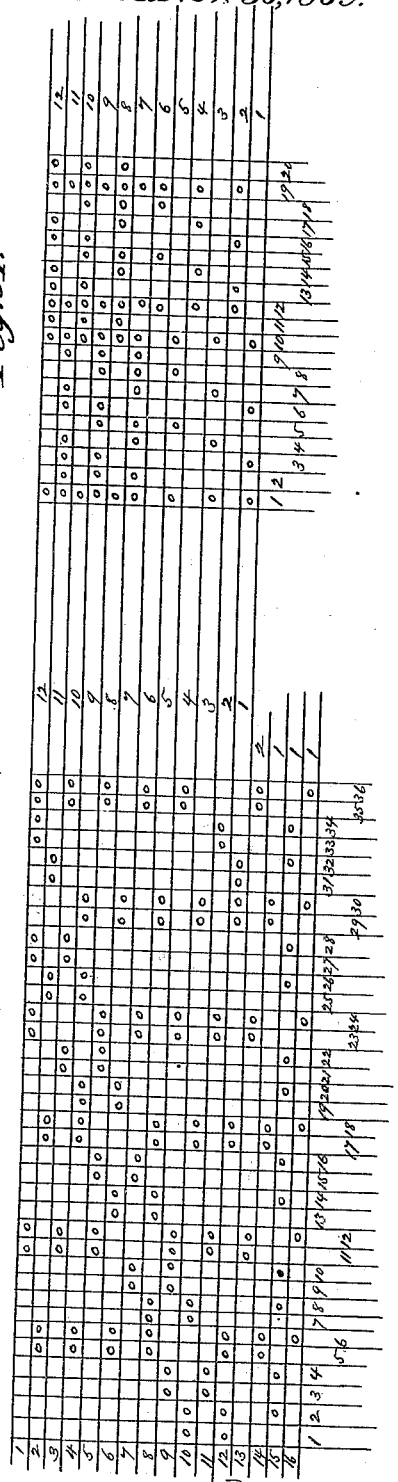

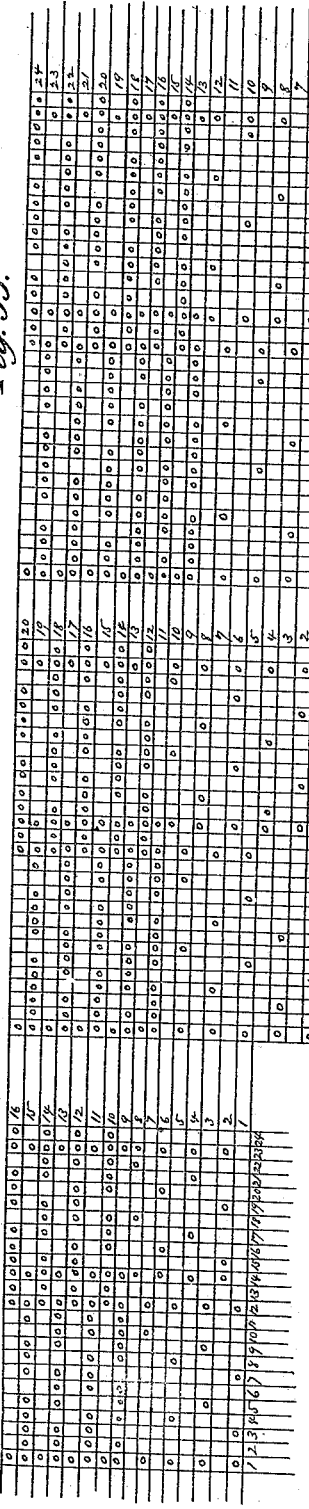

United States Patent Office.

JOHN OWENS, OF SALFORD, ENGLAND.

Letters Patent No. 97,434, dated November 30, 1869.

---

IMPROVEMENT IN METHOD OF WEAVING FABRICS.

---

The Schedule referred to in these Letters Patent and making part of the same.

---

*To all whom it may concern:*

Be it known that I, JOHN OWENS, of Salford, in the county of Lancaster, in England, have invented certain new and useful "Improvements in the Manufacture of Pile and other Fabrics;" and I hereby declare the following to be a full, clear, and exact description thereof, reference being had to the annexed eleven sheets of diagrams, forming part of this specification; that is to say—

My invention is applicable to those pile-fabrics in which the pile is produced by floating the weft-threads over the warp-threads, and then cutting the weft-threads; and It consists in an improved mode of weaving, by which the whole of the pile-weft appears on the face, and the back is plain or twilled.

In performing my invention, I employ an ordinary loom, having one, or two, of more shuttles, containing the different qualities of weft required.

I first throw one or more shots of the pile-weft, and then one or more shots of the weft for the back and for the binding. In all cases, the number of shots of the pile-weft is greater than the shots of the binding-weft, and the binding-weft, being generally coarser than the pile-weft, forces up the pile-weft, and makes a close back.

I am also enabled to make a plain cloth, or twilled selvage, of any width, by floating the pile-weft across the selvage, which is produced entirely by the warp and the binding or back weft.

My invention is particularly beneficial when applied in the manufacture of velvets, having a silk pile and a cotton back, but it may be used in manufacturing plushes or cords, with a worsted face and cotton back, or for various other descriptions of piled fabrics, having the face and back of different materials. Plain, twilled, diagonal, or figured piled fabrics can be produced in the manner above described, either with or without a plain back.

My invention may also be applied in weaving double fabrics, united by the pile-weft, and then cut asunder, in the usual manner, and to plain, twill, diagonal, or figured woollen or other cloth, that does not require a piled face, but in which one face is required, of a better or more expensive material than the other.

And in order that my invention may be fully understood and readily carried into operation, by a competent, practical weaver or designer, I will proceed to describe the diagrams, which represent several tie-ups, or modes of arranging and working the healds, and throwing in the weft to produce the desired fabrics.

The looms in which my improved fabrics are woven are of the ordinary description, having, by preference, two or more shuttles, containing the weft for the face and back of the fabric. When the fabric is taken out of the loom, the pile-weft is cut, when required, in the ordinary manner, and raised, to form the face of the fabric.

In the accompanying diagrams, the spaces between the horizontal lines indicate the healds or shafts, and the spaces between the vertical lines indicate the treadles. The *o o*, in the spaces between these horizontal and vertical lines, show the order of succession in which the healds are raised.

The lowest horizontal space, marked 1, represents the catch-cord or shaft, to prevent the weft going back in the same shed.

The two next spaces, marked 1 and 2, represent the selvage-shafts, and the others, marked 1, 2, 3, 4, 5, and 6, are the shafts for the body of the fabric.

On sheet 1, the diagram, Figure 1, is for weaving a plain-backed velvet, with a plain selvage. The first shed is made by raising the front selvage-shaft and the first, third, and fifth shafts of the body of the fabric, and lowering the second selvage-shaft and the second, fourth, and sixth body-shafts. The second shed is formed by raising the first body-shaft and lowering all the others. The third shed is formed by raising the third body-shaft and lowering all the rest. The fourth shed is formed by raising the fifth body-shaft and lowering all the rest. The fifth shed is formed by raising the catch-cord shaft, the front selvage-shaft, and the first, third, and fifth body-shafts, and lowering the second selvage-shaft, and the second, fourth, and sixth body-shafts. The sixth shed is formed by raising the second selvage-shaft, and the second, fourth, and sixth body-shafts, and lowering the catch-cord shaft, the front selvage-shaft, and the first, third, and fifth body-shafts. The seventh shed is formed by raising the second body-shaft, and lowering all the rest. The eighth shed is formed by raising the fourth body-shaft, and lowering the rest. The ninth shed is formed by raising the sixth body-shaft, and lowering the rest; and the tenth or last shed is formed by raising the catch-cord shaft, the second selvage-shaft, the second, fourth, and sixth body-shafts, and lowering the front selvage-shaft, and the first, third, and fifth body-shafts.

By this arrangement the pile-weft is thrown across at the second, third, fourth, seventh, eighth, and ninth sheds, and it is made to float over five warp-threads, and the pile-weft is brought to the face of the fabric by throwing two shots of weft for the back at the first and fifth sheds, and at the sixth and tenth sheds.

The diagram, Figure 2, represents a tie-up for weaving a fabric similar to that produced by fig. 1, but with the twill in the contrary direction.

Figures 3 and 4 are tie-ups corresponding to figs. 1 and 2, but with the draught broken, or arranged with the uneven and even numbers in succession. This arrangement is sometimes desirable for facilitating the working of the healds, or for other purposes. I wish to observe here, that all the subsequent tie-ups may be arranged by broken draught, upon the same principle as figs. 3 and 4.

Figure 5 is a tie-up for weaving a fabric similar to that produced by fig. 1, but with twice the quantity of pile-weft on the face.

Figure 6 is the reverse of fig. 5, but in other respects similar.

Figure 7 is a tie-up similar to fig. 1, but for producing a fabric having three times the quantity of pile-weft on the face.

Figure 8 is the reverse tie-up to fig. 7.

Figure 43:
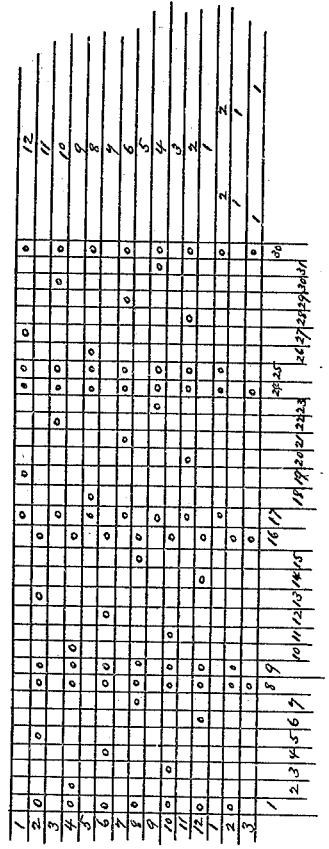

On sheet 2, Figure 9 is a tie-up to produce a fabric with four times more pile-weft than that produced by fig. 1.

Figure 10 is the reverse of fig. 9.

Figure 11 is a tie-up to produce a fabric very similar to that produced by fig. 9, but having four more shoots of weft in the back, to increase the strength.

Figure 12 is the reverse of fig. 11.

Figure 13 is a tie-up very similar to fig. 5, but with four additional shoots of weft in the back, to increase the strength.

Figure 14 is the reverse of fig. 13.

On sheet 3, Figure 15 is a tie-up similar to fig. 7, but with the four additional shoots of weft in the back.

Figure 16 is the reverse of fig. 15.

Figure 17 is a tie-up for producing a particularly strong and full-faced velvet.

Figure 18 is a tie-up to produce a fabric with both faces alike, either or both of which may be cut.

On sheet 4, Figure 19 is a tie-up to produce a twilled-back velvet, with a double-piled face.

Figure 20 is a diagram of a plain-back velvet, with a plain selvage, produced in a loom with eleven shafts, that is to say, one for the catch-cord, two for the selvage, and eight for the body of the fabric.

Figure 21 is a tie-up similar to fig. 20, but with the draught broken.

Figure 22 is a tie-up for a plain-back satin-faced velvet.

Figure 23 is the broken tie-up for a velvet, similar to fig. 22.

Figure 24 is the tie-up for a twilled-back velvet with a fuller face than fig. 20.

Figure 25 is the broken draught for fig. 24.

On sheet 5, Figure 26 is the tie-up for a twilled-back velvet with an extra full face.

Figure 27 is a tie-up to produce a fabric with both faces alike, and with a twilled middle.

Figure 28 is the tie-up for a satin-faced velvet, with a twilled and plain back.

Figure 29 is the tie-up of a plain-back velvet, with a satin face and a plain selvage, produced in a loom with thirteen shafts, that is to say, one for the catch-cord, two for the selvage, and ten for the body of the fabric.

Figure 30 is the tie-up for a plain-back velvet with a rolling face.

On sheet 6, Figure 31 is the tie-up for a plain-back velvet.

Figure 32 is the tie-up for a plain-back velvet, with double-pile satin face.

Figure 33 is the tie-up for a velvet with a rolling face double pile.

Figure 34 is the tie-up for a single-pile satin-face velvet, with back and face alike.

Figure 35 is the tie-up of a single-pile rolling-face velvet, with both sides alike.

Figure 36 is a tie-up for a double-pile satin-face velvet, with both sides alike.

Figure 37 is the tie-up for producing a plain-back velvet, in a loom with fifteen shafts, that is to say, one for the catch-cord, two for the selvage, and twelve for the body of the fabric.

On sheet 7, Figure 38 is the reverse of fig. 37, but produces a similar fabric.

Figure 39 is a tie-up for producing a satin-faced velvet with a plain back.

Figure 40 is a tie-up for producing a velvet similar to fig. 39, without catch-cord and selvage.

Figure 41 is the tie-up for producing another satin-faced velvet, with a plain back.

Figure 42 is the tie-up for a stronger velvet, with a satin face and plain back.

On sheet 8, Figure 43 is the tie-up for producing a double-faced satin velvet, with a double back.

Figure 44:
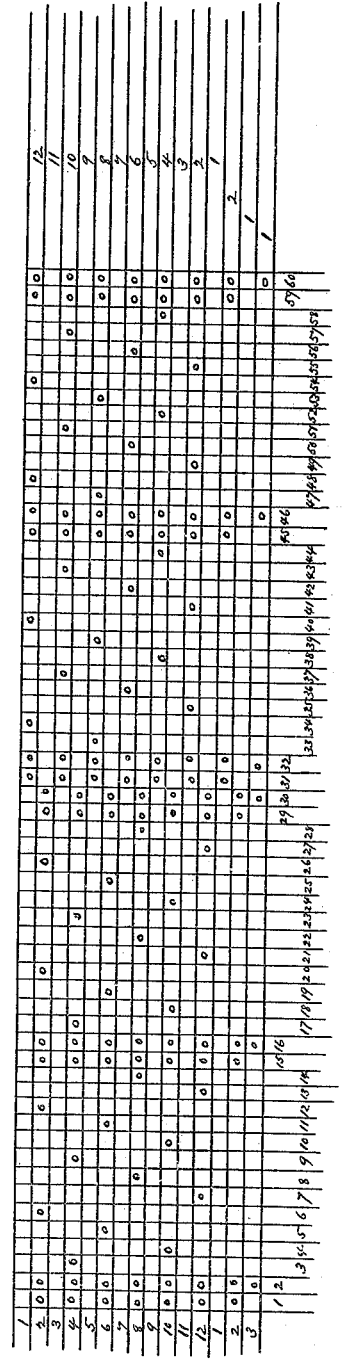

Figure 44 is the tie-up for producing a fourfold satin-faced velvet, with a double back.

On sheet 9, Figure 45 is the tie-up for a double satin-faced velvet, with both sides of the fabric alike.

Figure 46 is the tie-up for producing a diagonal velvet with a twilled back.

Figure 47 is for producing a diagonal velvet with a plain back.

Figure 48 is for producing a double-faced diagonal velvet with a twilled back.

On sheet 10, Figure 49 is the tie-up for producing a diagonal double-faced velvet with a double-twilled back and twilled selvage, having the weft on the top side of the selvage. This fabric requires seventeen shafts, that is to say, two for the catch-cord, three for the selvage, and twelve for the body.

Figure 50 is the tie-up for a diagonal double-faced velvet, with a plain back and plain selvage, produced in a loom with two catch-cord shafts, two shafts for the selvage, and twelve for the body.

Figure 51 is the tie-up for weaving a plain-back double fabric, united by the pile-weft in a loom with twelve shafts.

Figure 52 is for producing a similar fabric with a shorter pile.

On sheet 11, Figure 53 is the tie-up for weaving a double fabric united by the pile-weft, in a loom with sixteen shafts.

Figure 54 is for producing a similar double fabric, with twenty shafts.

Figure 55 is for producing a similar double fabric, with twenty-four shafts.

(In the above tie-ups for weaving double fabrics, two three, four, five, six, seven, or eight warp-threads are drawn into one dent.)

Figure 56 is the tie-up for a plain selvage, with two shafts.

Figure 57 is for a twilled selvage, with three shafts, weft upward.

Figure 58 is for a similar selvage, with the warp upward.

Figure 59 is for a twilled selvage, with four shafts, weft upward.

Figure 60 is for a similar selvage, with warp upward.

Figure 61 is for a satin-twilled selvage, with four shafts, weft upward.

Figure 62 is for a similar selvage, with warp upward.

Figure 63 is for a selvage, having both sides with a double twill.

Figure 64 is a five-shaft satin-twill selvage, weft upward.

Figure 65 is for a similar selvage, with the warp upward.

Figure 66 is for a selvage with satin face, weft upward.

Figure 67 is for a similar selvage, with the warp upward.

Figure 68 is for a selvage with a two-twilled weft face, and a three-twilled warp back.

The selvages above described can be applied to any of the tie-ups for weaving my improved fabrics.

I do not claim a twilled back as such, but a twilled back which, upon my method, affords the protection to the pile-weft from friction in wear, and any injury to the pile-weft at the back of the cloth, such as being scratched out by the finger-nail, as shown by my tie-up, fig. 24, upon Sheet No. 2, for twelve shafts, twenty-eight picks to the round, which is complete, upon my principle, making a twilled back for the body of the cloth, and twilled or diagonal selvage. Thus I work.

Treadle No. 1, for a binding or protecting-pick raises, No. 1 and No. 3 selvage-shafts and sinks Nos. 2 and 4 selvage-shafts, and also raises 1, 3, 5, 7, and sinks 2, 4, 6, 8, body-shafts. This shot affords protection at the back.

Treadle No. 2 is a pile-treadle, and sinks Nos. 1, 2, 3, and 4, selvage-shafts, and raises body-shaft No. 1, sinking body-shafts Nos. 2, 3, 4, 5, 6, 7, 8.

Treadle 3, for pile, sinks 1, 2, 3, 4, selvage-shafts, and sinks 1, 2, body-shafts; raises No. 3, sinking 4, 5, 6, 7, 8.

Treadle No. 4 sinks 1, 2, 3, 4, selvage-shafts and also sinks Nos. 1, 2, 3, 4, body-shafts, raising No. 5, sinking Nos. 6, 7, 8.

Treadle No. 5 sinks Nos. 1, 2, 3, 4, selvage-shafts, and also sinks Nos. 1, 2, 3, 4, 5, 6, body-shafts, raising No. 7, sinking No. 8.

Treadle No. 6, the first twill-pick for the back, raises No. 1, selvage-shaft, and sinks 2, 3, 4, and raises body-shafts Nos. 1, 3, 5, sinking 2, 4, 6, 7, 8.

Treadle No. 7, pile-treadle, sinks 1, 2, 3, 4, selvage-shafts, and raises body-shaft No. 1, sinking 2, 3, 4, 5, 6, 7, 8.

Treadle No. 8, pile-treadle, sinks 1, 2, 3, 4, selvage-shaft, and sinks 1, 2, body-shafts; raises No. 3, sinking 4, 5, 6, 7, 8.

Treadle No. 9, pile-treadle, sinks 1, 2, 3, 4, selvage-shafts, and sinks 1, 2, 3, 4, body-shafts; raises No. 5, sinking 6, 7, 8.

Treadle No. 10, pile-treadle, sinks 1, 2, 3, 4, selvage-shafts; sinks 1, 2, 3, 4, 5, 6, body-shafts; raises No. 7, sinks No. 8.

Treadle No. 11, second twill-treadle, sinks No. 1 selvage-shaft, raises No. 2; sinks 3 and 4; raises body-shaft 1, 3, 7, sinking 2, 4, 5, 6, 8.

No. 12 treadle, pile-treadle, sinks 1, 2, 3, 4, selvage-shafts, raises No. 1 body-shaft, sinking 2, 3, 4, 5, 6, 7, 8.

No. 13, treadle for pile, sinks 1, 2, 3, 4, selvage-shafts; sinks 12, body-shaft; raises No. 3, sinking 4, 5, 6, 7, 8.

No. 14, treadle for pile, sinks 1, 2, 3, 4, selvage-shafts; sinks 1, 2, 3, 4, body-shafts; raises 5, sinks 6, 7, 8.

No. 15, treadle for pile, sinks 1, 2, 3, 4, selvage-shafts; sinks Nos. 1, 2, 3, 4, 5, 6, body-shafts; raises No. 7, sinking No. 8.

No. 16 treadle, third twill-treadle, sinks 1, 2, selvage-shafts, raises No. 3; sinks No. 4, raises No. 1, body-shaft; sinks 2, 3, 4, raises No. 5, sinking No. 6; raise 7, sink 8.

No. 17, treadle for pile, sinks Nos. 1, 2, 3, 4, selvage-shafts, raises No. 1 body-shaft; sinks 2, 3, 4, 5, 6, 7, 8.

No. 18, treadle for pile, sinks 1, 2, 3, 4, selvage-shafts; sinks 1 and 2 body-shafts, raises 3, sinking 4, 5, 6, 7, 8.

No. 19, treadle for pile, sinks 1, 2, 3, 4, selvage-shafts; sinks 1, 2, 3, 4, body-shafts, raises 5, sinking 6, 7, 8.

No. 20, treadle for pile, sinks 1, 2, 3, 4, selvage-shafts; sinks 1, 2, 3, 4, 5, 6, body-shafts, raises 7, sinking No. 8.

No. 21, fourth twill-treadle, sinks 1, 2, 3, selvage-shafts, raises No. 4; sinks 1, 2, body-shafts, raises No. 3; sinks 4, raises 5; sinks 6, raises 7; sinks 8.

No. 22, pile-treadle, sinks 1, 2, 3, 4, selvage-shafts, raises 1 body-shaft, sinking 2, 3, 4, 5, 6, 7, 8.

No. 23, treadle for pile, sinks 1, 2, 3, 4, selvage-shafts; sinks 1, 2, body-shafts, raises 3; sinks 4, 5, 6, 7, 8.

No. 24, treadle for pile, sinks 1, 2, 3, 4, selvage-shafts; sinks 1, 2, 3, 4, body-shafts, raises 5; sinks 6, 7, 8.

No. 25, treadle for pile, sinks 1, 2, 3, 4, selvage-shafts; sinks 1, 2, 3, 4, 5, 6, body-shafts, raises 7, sinking No. 8.

No. 26, treadle for binding and protecting shot for both the twilled back and the face, raises Nos. 1 and 3, sinking Nos. 2 and 4 selvage-shafts, and raises body-shaft Nos. 1, 3, 5, and 7, sinking 2, 4, 6, 8.

No. 27, treadle binding shot for the other half of the warp, in the same manner that No. 1 and No. 26 are used for the first half of the warp, and sinks No. 1; raises 2, sinks 3; raises 4, selvage-shafts, and sinks No. 1 body-shaft; raises No. 2, sinks 3; raises 4, sink 5; raise 6, sink 7; raise 8.

No. 28 treadle is just the same as No. 27, but has a catch-cord to prevent the weft from lashing in as it returns in the same shed. Thus, No. 1 and No. 26 are protecting-shots, No. 1 going under shots 2, 3, 4, 5, and partly under 6, and No. 26 shot goes under 25, 24, 23, 22, and partly under No. 21, protecting the back of the pile-weft, so as that the pile-weft cannot be worn by friction at the back, nor can it be scratched out by the finger-nail. Then Nos. 27 and 28 bind it well in.

This twill or diagonal selvage is made from the same warp, and from off the same beam, and differs from every other method to me known, of attaching twilled selvages by power, and only receives weft-shots at treadle Nos. 1, 6, 11, 16, 21, 26, 27, 28, thus saving the weft-pile usually used to make the selvage, weft for face being used only where required for the face, as all other plain and twill selvages are usually put on by hand-looms, and then with a separate beam.

Having thus described the natue of my invention, and given various modes of carrying the same into practical operation, I wish it to be understood that I do not bind myself to the details given, as the strength of the back and the length and thickness of the pile can be varied by slightly altering the order of succession in which the shafts are worked. I wish also to observe that my invention is applicable for weaving fabrics that do not require a piled face, but in which one face is of a better or more expensive material than the other. In such cases the operation of cutting the races of weft is dispensed with.

My method of weaving differs from all others hitherto employed by manufacturers, since it forms the back of the cloth at the back of the pile-threads, to act as a protection thereto, and the pile or face of the cloth, (formed entirely from the weft,) is interlocked with each of the warp-threads.

The product is a cloth free from cracks or ridges, which is a result never hitherto attained in power, looms.

By my method of weaving, the pile-weft does not appear at all on the wrong side of the fabric, and cannot, therefore, be scratched or pulled out from the back, while each warp-thread serves also as a support to a weft-thread.

What, therefore, I esteem as of my invention, and desire to protect by Letters Patent, is—

The method above described of weaving pile or other fabrics, namely, by forming the pile or face-surface of the fabric from the weft alone, interlocked with the warp, as set forth, so that the weft-face appears only on the face, being protected and secured by the back-weft, and each warp-thread serving to hold a pile-weft and form a cutting-race, in the manner specified.

In testimony whereof, I have hereunto set my hand, before two subscribing witnesses.

JOHN OWENS.

Witnesses:
H. B. BARLOW.
T. E. BARLOW.